June 15, 1926.
J. M. ODEN
COUPLING
Filed Feb. 16, 1922
1,588,605
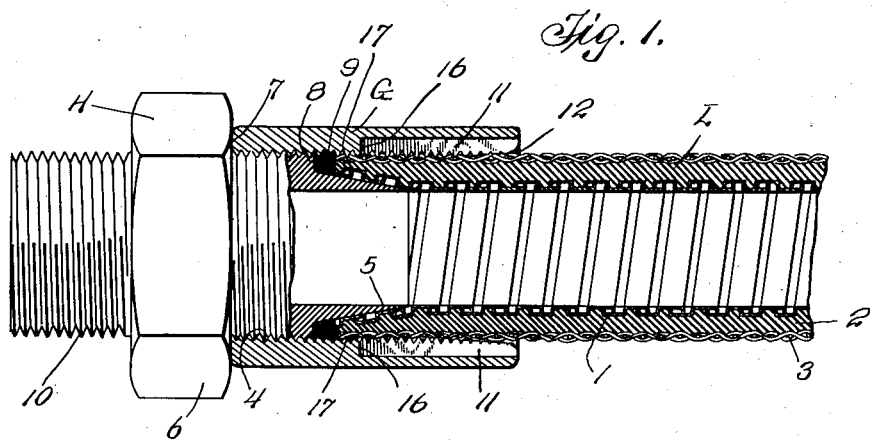
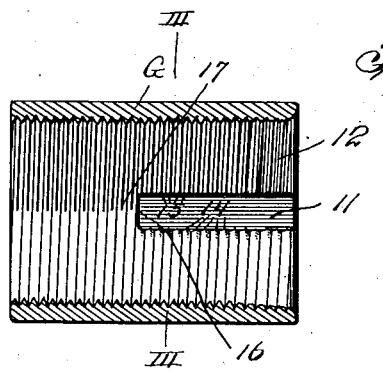
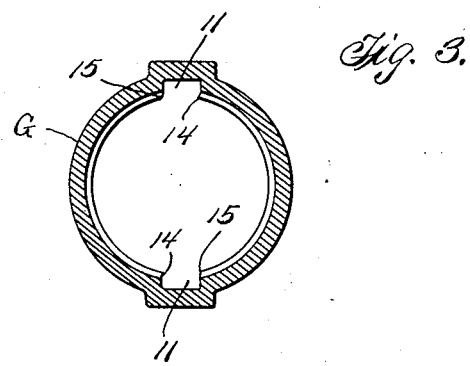
INVENTOR
John M. Oden
BY
ATTORNEY Patented June 15, 1926.

1,588,605

UNITED STATES PATENT OFFICE.

JOHN M. ODEN, OF BROOKLYN, NEW YORK.

COUPLING.

Application filed February 16, 1922. Serial No. 536,893.

This invention relates to a hose coupling, and particularly to means for facilitating easy and proper application of the coupling to the end portion of a piece of hose, in this respect being an improvement upon the structure shown and described in my Patent, No. 1,288,148, Dec. 17, 1918.

The coupling illustrated in said patent, and shown in the drawings herewith, consists of a body member and a sleeve member, the sleeve member being fitted over the end of the hose, and the body member being screwed into a projecting part of the sleeve in such wise that interrotation of the body and sleeve will cause a tapered portion of the body to progress into the hose and thereby wedge the outer surface of the hose into tighter engagement with the inner surface or the sleeve. It has been found in practice that while this structure is eminently efficient, and the parts thereof readily assembled on a hose by the use of proper tools, yet, in instances where proper tools are not available, then the assembly of the parts, and particularly of the sleeve, into its position over the hose, presents serious problems, and sometimes results in inefficient assembly.

If the sleeve can be gotten to its appointed place upon the hose, then the remainder of the assembling operation is relatively simple and may be performed with uniform efficiency, and it is, therefore, a prime object of this invention to provide means for facilitating the easy and correct assembly of the sleeve on to the hose.

Other and more detailed objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown merely a preferred form of embodiment of the invention:—

Figure 1 is a longitudinal sectional view thru a coupling constructed in accordance with this invention and showing the same applied to a piece of hose as in use.

Figure 2 is a longitudinal sectional view of the sleeve detached, and

Figure 3 is a transverse sectional view upon the plane of line III of Fig. 2.

Referring to the drawings for describing in detail the structure which is therein illustrated, the reference character L indicates the hose over the end portion of which, as seen in Fig. 1, fits the sleeve G and into this is threaded the body H.

The hose illustrated is commercially known as "Triplexd" hose, being formed of an inner lining 1 of metal, a filler 2 of rubber, or composition, and an outer casing, or cover 3, of woven canvas, or the like. The metal lining 1 may be formed in any appropriate manner but, as indicated, consists of spirally wound strip material so as to render the hose easily flexible, in a manner well known in this art.

The sleeve G is screw threaded interiorly and is of a size to fit snugly over the outer surface of the hose L, the threads of the sleeve engaging the multitudinous protuberances formed by the weave of the canvas cover of the hose.

The sleeve is arranged so that it projects somewhat beyond the end of the hose.

The body H is formed with an externally threaded portion 4, arranged to engage the threads of the extending portion of the sleeve. A tapered extension 5 is formed beyond the portion 4 adapted to be forced into the end of the hose by which action it will in turn operate to spread the end portion of the hose and to thereby clamp the material of the hose tightly against the inner surface of the sleeve.

A nut shaped portion 6 is provided for rotating the body, said portion constituting a shoulder 7 for engaging the adjacent end of the sleeve to limit inward movement of the body.

A further shoulder, as 8, is provided at the larger end of the tapered portion 5, and preferably a gasket, as 9, of felt, leather, or the like, is interposed between said shoulder and the adjacent end of the hose where it will be tightly compressed when the body is screwed home. As the cavity within which this gasket is contained grows smaller as the body is screwed home, the pressure upon the gasket will be so great as to force portions of the gasket into the small interstices which inevitably occur between the parts of the device forming the cavity so that these interstices are effectually sealed against possible passage of fluid outwardly from within the hose.

If desired the gasket may be impregnated with a suitable sealing material, as shellac, or other appropriate gum, or the like, a portion of which material will naturally be squeezed from the gasket and into the mentioned interstices where it will form a more effectual seal against possible passage of fluid from within the hose.

At the opposite side of the nut portion 6, an extension 10 is provided by means of which connection may be made with any desired object. This extension may be threaded either internally or exteriorly, or may take any appropriate form according to requirements.

In attaching the coupling to the hose, the sleeve G is first screwed on to the hose to a position substantially as indicated. The body H is then introduced and screwed into the sleeve. Necessary force is applied to the sleeve and body to continue inward movement of the body preferably until the sleeve comes to rest against shoulder 7 during which time the portion 5 is advanced into the hose so as to exert a bursting force upon the hose which is resisted by the sleeve. The result is that the end portion of the hose is clamped and squeezed tightly between the tapered portion 5 and the interior surface of the sleeve, the material of the hose being forced into the threads of the sleeve under a powerful pressure. The gasket 9 will, at the same time, be confined and compressed in a manner and with a result as already referred to.

Engagement of the threads of the sleeve with the material of the hose prevents any creeping action of the sleeve along the hose during the inward movement of the body.

It is noted that the coarse cover 3 of the hose by its character and surface formation, provides an excellent medium for gripping the threads of the sleeve, that the metallic lining 1 of the hose serves to maintain unchanged the interior diameter of the hose during application of the sleeve G thereover, and provides an excellent surface for frictional cooperation with the tapered portion 5 of the body, and that the rubber, or other elastic filler 2 of the hose provides an ideal material to receive and transmit the compression force incident to movement of the tapered portion 5 into the hose.

In order that the sleeve G may have a sufficient grip upon the hose to enable it to withstand the pull of the body when the body is being screwed home, it is necessary that the relative sizes of the sleeve and hose shall be such that the sleeve shall have a very tight fit over the hose. On this account it follows that as heretofore constructed efficient tools were required to grip the hose and sleeve and to force the sleeve on to the hose.

As herein illustrated, however, it is proposed that the sleeve be made to comprise means for at least partially cutting its way on to the hose, thus making interrotation of the sleeve and hose more easily accomplished and rendering the use of tools not essential. As illustrated in the drawings, this means consists in forming within the sleeve one or more slots 11 which extend longitudinally of the sleeve and transverse to the threads of the sleeve and of tapering off the threads toward the inner end of the sleeve, as indicated at 12.

Altho the slots 11 may be cut into the sleeve after the threads have been formed, yet it is preferable that they be formed prior to the cutting of the threads, since by this method of procedure burrs formed by the thread cutting tool as said tool enters the slots will constitute thread cutting points, as indicated 14, upon the ends of the threads, said cutting points being dragged, or flared, so as to overhang and project into the slots in acute angular relationship to the apexes of the threads so that when the sleeve is being rotated on to a hose they will, to a desirable extent, cut their way thru the material of the cover 3 of the hose, thus reducing the amount of power required for rotating the sleeve on to the hose.

By cutting away, or tapering the threads at the inner end of the sleeve, as indicated 12, a gradual cutting of the cover 3 by the burrs, or points, 14, is provided for so that correspondingly greater ease of application of the sleeve is accomplished.

By cutting the threads after the slots are formed the corners 15 of the threads opposite the cutting corners 14, are pressed backwardly by the thread cutting tool so that said corners are more or less rounded and in use will operate to permit of retrogressive passage of said threads thru the threads of the cover 3, formed by the corners 14, whenever, for any reason, it is desired to remove the sleeve from the hose.

By these means it is apparent that the efficiency of grip between the sleeve and the hose will not be impaired notwithstanding the fact that greater ease of application and removal is afforded.

The length of the slot 11 is such that its end, as 16, terminates short of the gasket 9 so as thus to leave an uninterrupted portion, as 17, of the threads of the sleeve lapping the hose between the gasket and the end 16. This arrangement prevents any undue displacement of the gasket material into, or thru, the slots 11, which displacement might detract from the efficiency of the seal.

It will be understood that by the use of the word "cut", or "cutting", for describing the thread-way forming means provided in the sleeve is meant a means which will actually cut or tear its way through the material of the hose cover so as to make way for the following portions of the threads when the sleeve is being rotated on to the hose, as distinguished from the simple squeezing or embedding result attained by the use of the smooth uninterrupted threads illustrated in my Patent #1,288,148 referred to.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A hose coupling comprising a sleeve adapted to be fixed to the hose by being threaded thereonto, said coupling comprising also a body part having threaded engagement with the sleeve and being adapted upon rotation relative to the sleeve to pull upon the sleeve and to thereby force itself into sealing engagement with the hose, said sleeve having a groove formed interiorly thereof extending transversally across the threads so as thus to provide a plurality of cutting edges associated with said threads of a character to cut a thread-way into the surface of the hose for facilitating application of the sleeve on to the hose, and said cutting edges having acute angular relationship to the apexes of the threads thus providing cutting points overhanging into said groove for the purpose set forth.

2. A hose coupling comprising a sleeve adapted to be fixed to the hose by being threaded thereonto, said coupling comprising a body part having threaded engagement with the sleeve and being adapted upon rotation relative to the sleeve to pull upon the sleeve and to thereby force itself into engagement with the hose, said sleeve having a groove formed interiorally thereof extending transversally across the threads and providing thread ends at opposite sides of the groove, the thread ends at one side of the groove having cutting points overhanding the groove, and the threaded ends at the opposite side of the groove being rounded, all for the purpose set forth.

In testimony whereof I affix my signature.

JOHN M. ODEN.